(12) United States Patent
Cloonan et al.

(10) Patent No.: US 6,636,482 B2
(45) Date of Patent: Oct. 21, 2003

(54) METHOD AND APPARATUS FOR CONTROLLING TRAFFIC LOADING OF DIFFERENT SERVICE LEVELS IN A CABLE DATA SYSTEM

(75) Inventors: Thomas J. Cloonan, Lisle, IL (US); Daniel W. Hickey, Oswego, IL (US)

(73) Assignee: Arris International, Inc., Duluth, GA (US)

( * ) Notice: Subject to any disclaimer, the term of this patent is extended or adjusted under 35 U.S.C. 154(b) by 39 days.

(21) Appl. No.: 09/802,179

(22) Filed: Mar. 8, 2001

(65) Prior Publication Data

US 2002/0126699 A1 Sep. 12, 2002

(51) Int. Cl.[7] .............. H04J 1/16; H04J 3/14; H04L 12/66
(52) U.S. Cl. ............... 370/230; 370/468; 370/485; 375/222; 725/111
(58) Field of Search .................. 370/229, 230, 370/230.1, 232, 233, 234, 235, 395.2, 395.21, 419, 420, 468, 480, 485, 486; 725/111, 112, 114, 118; 375/222

(56) References Cited

U.S. PATENT DOCUMENTS

| | | | |
|---|---|---|---|
| 5,862,126 A | 1/1999 | Shah et al. | |
| 5,894,471 A | 4/1999 | Miyagi et al. | |
| 6,046,981 A | 4/2000 | Ramamurthy et al. | |
| 6,055,242 A | * 4/2000 | Doshi et al. | 370/468 |
| 6,097,722 A | * 8/2000 | Graham et al. | 370/468 |
| 6,201,790 B1 | * 3/2001 | Teboul | 370/232 |
| 6,324,184 B1 | * 11/2001 | Hou et al. | 370/468 |

* cited by examiner

Primary Examiner—Chau Nguyen
Assistant Examiner—Soon-Dong Hyun

(57) ABSTRACT

A method and apparatus for providing connection admission control (CAC) on a cable data system helps provide viable quality of service (QoS) capability on a cable data system. Cable data service is granted or denied to cable data service to said requesting subscriber based in part upon the determination of whether the available bandwidth is greater than, less than or equal to the bandwidth to be allocated to the requesting subscriber.

16 Claims, 3 Drawing Sheets

METHOD AND APPARATUS FOR CONTROLLING TRAFFIC LOADING OF DIFFERENT SERVICE LEVELS IN A CABLE DATA SYSTEM

FIELD OF THE INVENTION

The present invention relates to a method and apparatus for controlling traffic loading on upstream channels to a cable modem termination system using connection admission control.

BACKGROUND OF THE INVENTION

In order to provide more products to their subscriber base, cable television companies are offering access to the Internet through their cable modem (CM) boxes. The benefits in using the cable companies instead of a dial-up Internet Service Provider is multiple services under one bill, always-on access, and, in some cases, higher speed access.

In order to provide their customers with Internet access, the cable companies use some of the 50–800 MHZ spectrum typically set aside for their television channels to provide the bandwidth required for the data transfers. A typical cable system has the bandwidth to provide 100 or more television channels to subscribers. Each NTSC television signal requires 6 MHZ of bandwidth.

In order for a cable subscriber to access the Internet through their cable television provider, the subscriber must have a CM. The CM is similar to the Cable Modem Termination System (CMTS) equipment required at the cable company's headquarters, except for the greater size required at the headquarters. This is to accommodate a greater number of signals than is required by the home modem.

The home CM box and the CMTS use well-known Ethernet frames to communicate between them. The cable system, however, uses a different modulation scheme, Quadrature Amplitude Modulation (QAM), than is normally used in an Ethernet scheme.

Using the QAM modulation, the downstream (from the cable company equipment to the home CM) data rate is in the range of 30–40 Mbps for each 6 MHZ channel. This can accommodate between 500 and 2000 subscribers, The more subscribers that the cable company tries to fit in that spectrum, the lower quality signal for each subscriber results.

The upstream data flow is different and more complex. In the past, cable companies did not have to worry about providing bandwidth for the customer to communicate in the upstream direction. Pay-for-view movies and sports events, however, required this ability. The cable companies therefore, set aside the 5–42 MHZ spectrum to provide the necessary upstream access to the Internet from the home CM.

The world is now on the verge of a revolution that promises to change the way the Internet works and it is guaranteed to change the way the entire world communicates, works and plays. The revolution is the introduction of quality of service (QoS) to the Internet. This QoS revolution is already beginning, because most computer networking products (switches and routers) have already added some type of QoS to their feature sets. Unfortunately, there are many different forms of QoS from which to choose and they are not all compatible with one another. Different standards committees (DiffServ, RSVP, NTLS, etc.) are still deciding which of many different QoS proposals will actually be used in the Internet, and hybrid solutions will likely be developed in the very near future that will enable the QoS revolution.

The change is important, because it will eliminate the current Internet routing model that provides the same "best effort" service to all users, all packets, and all traffic flows. When QoS is enabled in a ubiquitous, end-to-end fashion across the Internet, differentiated services will be permitted, and all packets will be treated differently. High priority packets will be routed with lower latency and lower jitter, while low priority packets may experience more delay and jitter. The throughput needs of each application will determine the priority associated with its corresponding traffic flows, and it is likely that advanced application programs of the future will dynamically change the priority of traffic flows to match the very needs of the user through the entire duration of the session.

Since all packets will not be passed using the same priority level, it follows that all packets cannot be billed using the same charges in the future either. Future Internet users are likely to pay different amounts, for different classes of service, and they may even be billed on a usage basis, e.g., per-minute, per packet, or per byte, similar to the billing schemes used for long distance telephone service today. The use of high priority traffic flow for an application will undoubtedly result in higher Internet usage costs than the use of low priority traffic flows and service level agreements (SLAs) between the Internet user and their service provider will detail the available priority and throughputs in and their associated costs. These changes in the Internet billing model represent an incredible revenue generating potential for access providers that can provide and bill for these new differentiated services, and multiple system operators (MSOs) are key members of this group.

MSOs are positioned in an ideal location within the Internet to play a major role in the QoS revolution, and they will be able to capitalize on the resulting changes. This is because the MSOs are positioned to act as the QoS gatekeeper into the future Internet. They can perform this function because they have access to each subscriber's service level contract and can appropriately mark the priority of all packets that are injected into the Internet by their subscribers. In fact, the MSOs head end equipment, the cable modem termination system CMTS is actually the first piece of trusted equipment not owned by the subscriber to which subscriber packets must pass on their way to the Internet. The CMTS is positioned at the head end office and it provides basic connectivity between the cable plant and the Internet. FIG. 1 illustrates a simplified cable data system 10 with a CMTS 30. The CMTS 30 is connected through Internet link 40 to the Internet 20. The CMTS 30 is also connected through various cable links 50 to a plurality of subscribers 60.

The MSO also provides customer subscription packages and is able to offer (and bill for) many different subscriber service levels. In addition, if the CMTS equipment permits it, the MSO will also be able to offer dynamic service level upgrades to its subscribers. Features contained within an MSO's CMTS must provide most of these revenue generating QoS capabilities. This will result in even greater increases in revenues if the MSOs can maintain adequate counts on usage of different services levels consumed by its subscribers.

As set forth above, the CMTS provides basic connectivity between the cable plant and the local area network that interfaces to an edge router on the Internet. The CMTS is responsible for appropriately classifying, prioritizing, flow controlling, queuing, scheduling and shaping all the traffic flows between cable data subscribers and the Internet. As a result, the service provided to cable data subscribers will primarily be determined by the features in the CMTS core.

One important task of the CMTS will be congestion control. If the traffic congestion on upstream channels into the CMTS are not carefully monitored and controlled, information will be lost and subscribers will become dissatisfied with the service.

SUMMARY OF THE INVENTION

The invention provides a traffic congestion control solution for use on upstream channels coming into a CMTS using QoS parameters in a connection admission control system. The system first determines the amount of bandwidth available in an upstream channel and then determines how much bandwidth is requested by a subscriber. The system then determines whether or not to accept the subscriber's request using a connection admission control algorithm.

According to one embodiment of the present invention, a method of controlling traffic loading on a cable modem termination system (CMTS) having a plurality of basic upstream data service flow scheduling types for a cable data system is disclosed. The available bandwidth on an upstream data channel is determined. Data service flow scheduling type of a requesting subscriber is determined. The available bandwidth on the upstream data channel that can be allocated to the data service flow scheduling type is determined. The available bandwidth on an upstream data channel is compared to the bandwidth to be allocated by the CMTS to the requesting subscriber based upon the type of basic upstream data service flow scheduling type to be allocated to the requesting subscriber. It is then determined whether the available bandwidth is greater than, less than or equal to the bandwidth to be allocated by the CMTS to the requesting subscriber for the basic upstream data service flow scheduling type to be allocated for the requesting subscriber. Cable data service to the requesting subscriber is either granted or denied based upon the determination of whether the available bandwidth is greater than, less than or equal to the bandwidth to be allocated to the requesting subscriber.

BRIEF DESCRIPTION OF THE DRAWINGS

The teachings of the invention can be readily understood by considering the following detailed description in conjunction with the accompanying drawings, in which.

DETAILED DESCRIPTION

According to one embodiment of the invention, a connection admission control system and methodology is used in a CMTS to provide congestion control. Connection admission control (CAC) systems are well known in the field of ATM networks. See e.g., U.S. Pat. No. 6,046,981, issued Apr. 4, 2000 to Ramamurthy, et al., for a "Multi-Class Connection Admission Control Method for Asynchronous Transfer Mode (ATM) Switches." See also U.S. Pat. No. 5,862,126 issued Jan. 19, 1999 to Shah et al., for "Connection Admission Control for ATM Networks" and see U.S. Pat. No. 5,894,471 to Miyagi, et al., for a "ATM Network System and Connection Admission Control Method."

CAC systems use CAC algorithms, which use traffic descriptors (e.g., peak rate, mean rate also referred to as average rate or sustainable bit rate and maximum burst size) along with the desired QoS parameters (e.g., cell loss, cell delay and cell delay variation) to access the amount of available bandwidth required by the connection. The decision to accept or reject a connection is then based on the amount of available bandwidth on the outgoing link, in addition to other parameters which the network administrator may deem necessary to consider.

CAC principles can be applied to traffic control problems within a CMTS. A description of an illustrative CMTS will now be given followed by a discussion of how to use CAC to control traffic on upstream channels to a CMTS based on service level parameters.

Figure 1:
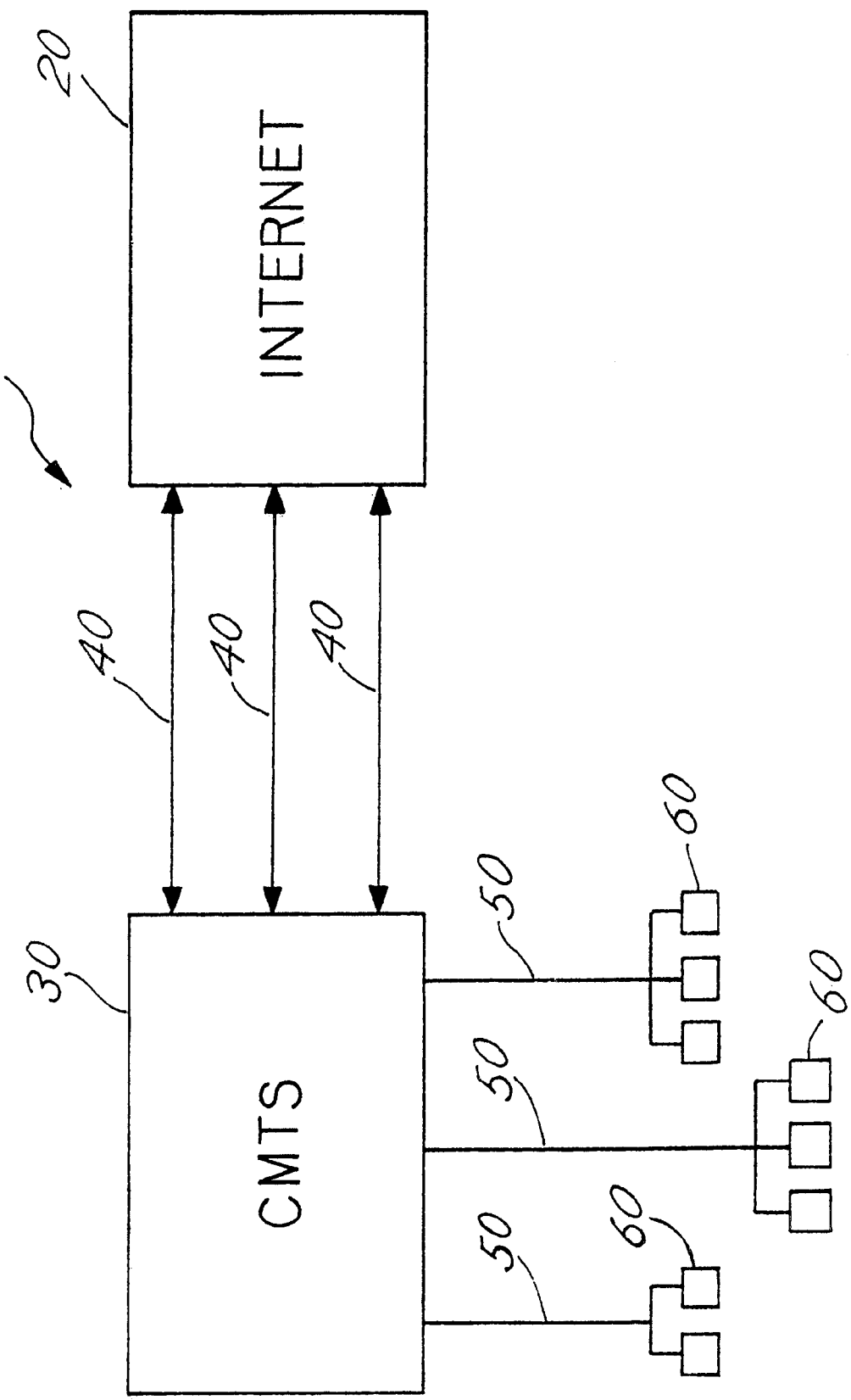
FIG. 1 illustrates an exemplary cable data system.
Figure 2:
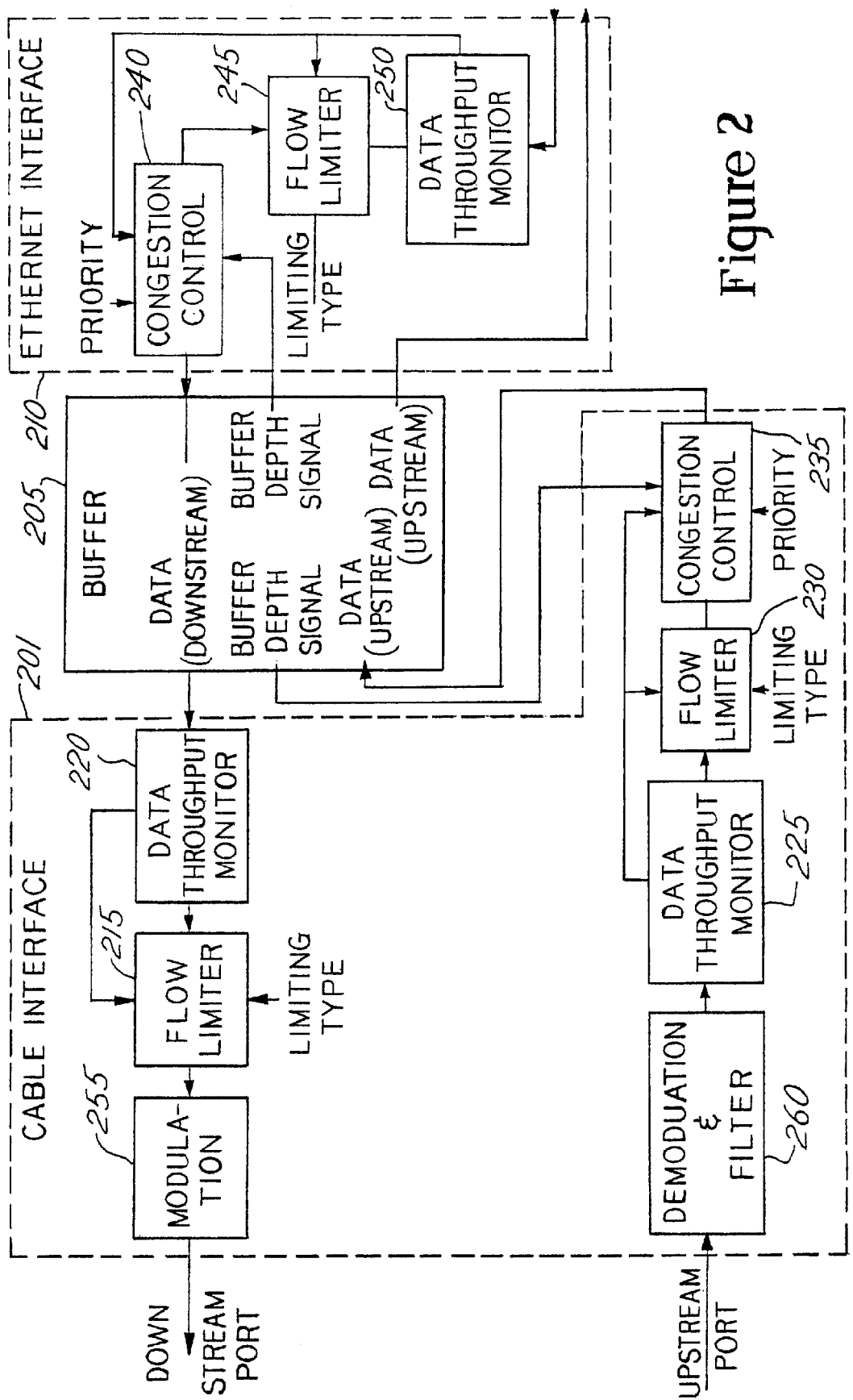
FIG. 2 illustrates a CMTS according to one embodiment of the invention.

FIG. 2 illustrates the preferred embodiment cable modem termination system (CMTS) apparatus of the present invention. The CMTS apparatus of FIG. 2 is comprised of a cable interface (201) that is coupled to a buffer circuit (205). The buffer circuit (205) is coupled to an Ethernet interface (210). In the preferred embodiment, each of the individual circuits (201, 205, and 210) reside physically on separate circuit boards. In alternate embodiments, any circuits having substantially the same function can reside on one circuit board or even one integrated circuit. In other words, the present invention is not limited to three separate circuit boards.

The cable interface (201) is responsible for interfacing the CMTS to the home cable modem apparatus. The cable interface (201) also provides the functions of modulation and demodulation.

The cable interface circuit is comprised of a downstream packet flow path and an upstream packet flow path. The downstream packet flow path is comprised of a data throughput monitor (220) that is coupled to a flow limiter (215). The data throughput monitor (220) has an input that is coupled to the buffer circuit (205) from which the data packets flow and a feedback from the upstream path. The feedback from the upstream path is to allow a first CM to talk with other CMs. The data throughput monitor (220) has the task of determining the rate of data packet flow.

In the preferred embodiment of the CMTS, the downstream data packet flow rate is typically either 30 or 40 Mbps for each 6 MHZ channel, using QAM techniques. Alternate embodiments could certainly use other flow rates and other modulation techniques. The cable company (or cable data service provider) decides which data packet flow rate depending on the outcome desired by the company. The lower data rate is less susceptible to noise while the higher data rate can include more data per unit of time for the customers.

The data packet flow rate signal is fed into the flow limiter (215). This signal controls the flow limiter function. If the flow is greater than a predetermined level, $T_{max}$, the data packet flow can be limited. The flow limiter (215) reduces the data rate by dropping packets until the flow is reduced to below $T_{max}$.

Another, second, input to the flow limiter (215) is the "limiting type" input. This control input is set by the cable company depending on how strict they wish a customer to adhere to the rules. If the "limiting type" input is set to "soft-limiting," the flow limiter (215) allows the data rate to go above the set data rate by a predetermined amount without dropping any packets.

Some cable companies may strictly limit a customer to $T_{max}$. In this case, the "limiting type" control input is set to "hard-limiting." If the data rate goes over the set hard limit, the flow limiter (215) drops any packets that force the customer to exceed $T_{max}$. The output of the flow limiter (215) is coupled to the cable that runs to the customers' cable modems.

The output of the flow limiter (215) is input to the modulator (255). This block (255) performs the QAM needed to transmit the data to the CMs.

The upstream data path is comprised of a demodulator and filter (260) that converts the QAM signal into data bits in order to be processed by the other blocks in the upstream path. The demodulated data bits are input to a data throughput monitor (225) that is coupled to the upstream port from the customer's CM. This data throughput monitor (225) has the same functionality as the downstream monitor (220) of monitoring the data rate but in the upstream direction to the Internet.

In the preferred embodiment, the upstream data rate can be in the range of 320 kb to 10.24 Mbps. Alternate embodiment use other rates.

The upstream data throughput monitor (225) is coupled to a flow limiter (230). This flow limiter has similar functionality to the flow limiter (215) in the downstream path. The upstream path flow limiter (230) has the data rate input from the data throughput monitor (225) as well as the "limiting type" control input that, in the preferred embodiment, is set to either "hard-limiting" or "soft-limiting" depending on the cable company rules. As in the downstream flow limiter (215), the upstream flow limiter, depending on the "limiting type" input, drops all packets that force the customer to exceed $T_{max}$.

The upstream path further comprises a congestion control block (235) that is coupled to the upstream data path out of the flow limiter (230). According to one embodiment of the invention, the congestion control block (235) can comprise, among other features, a CAC system, but the invention is not limited thereto. The data packets from the upstream data path flow through the congestion control block (235) to the buffer circuit (205). The function of the congestion control block (235) is to drop packets when the buffer depth is reaching a maximum point. By dropping the packets before they reach the buffer, the buffer will not overflow.

In order to accomplish the task of congestion control, the congestion control block (235) has control inputs that are used to determine when to drop packets and which packets to drop. In the preferred embodiment, these control inputs include the data rate signal from the upstream data throughput monitor (225), a buffer depth signal from the buffer (205), and a priority signal.

The data rate signal from the upstream data throughput monitor (225), as described above, "quantizes" the data rate and feeds that value to the congestion control block (235). The buffer circuit depth signal from the buffer circuit (205) instructs the congestion control block (235) as to the depth of the buffer. In other words, if for example the buffer (205) is 75% full, the buffer depth signal instructs the congestion control block (235) of this.

The priority signal that is input to the congestion control block (235) informs the congestion control of the priority of each packet. This is important in determining which packets to drop.

A group of packets is assigned a priority based on the customer's level of service plan. If the customer has signed up for the basic service plan and paid the smallest fee for the most basic service, his packets are assigned a low priority. This priority is embedded in a packet identification that is assigned to the group of packets and is decoded when the group of packets enters the cable interface.

If the customer has signed up for the "premium" service plan with the cable company, his packets are assigned the highest priority. If the customer has signed up for any service plans that are in between the premium and the basic plans, this priority is also assigned to each packet. As described before, the priority is added to the packet identification for a particular group of packets.

A customer may also decide to dynamically change his service level for a given session. In this case, different packet groups from that particular customer will have different priorities assigned to different packet identifications.

As described subsequently in other figures, the congestion control block (235) of FIG. 2 uses the priority assigned to a group of packets to determine how to process that particular group of packets. The output of the congestion control block is input to the buffer circuit's upstream data flow input.

The buffer circuit (205) stores the packets until the Ethernet circuit (210) has time to process that packet. The packets are fed from the buffer circuit (205) to the Ethernet circuit (210) as more processing time is freed up.

The downstream path of the Ethernet circuit (210) is comprised of a data throughput monitor (250) that is coupled to the connection to the Internet. This monitor (250) provides substantially the same function as the previously described data throughput monitors on both the upstream and downstream paths.

The data packets from the Internet flow from the data throughput monitor (250) to the Ethernet circuit flow limiter (245). This flow limiter (245) has substantially the same functionality as the above described flow limiters. This flow limiter also has the same inputs as described previously: the quantized data rate and the "limiting type" control input.

The data packets flow from the flow limiter (245) to the congestion control block (240). As in the upstream congestion control block (235), the Ethernet downstream congestion control block (240) has the three control inputs to determine which packets to drop: the quantized data rate, the buffer depth signal, and the packet priority signal. The congestion control block then drops a particular packet based on these control signals.

The downstream data flows from the congestion control block to the buffer circuit (205). The buffer circuit (205) stores the packets until the cable interface circuit has the processing time to work on additional packets.

The buffer circuit (205) is comprised of 128 MB of RAM, in the preferred embodiment. Alternate embodiments use other values of RAM or even other types of memory instead of RAM. The alternate types of memory include hard drives or other types of temporary memory.

The functions illustrated in FIG. 2, and described above, may be implemented in various ways, using various well known devices (structure) that include microprocessors, digital signal processors or combinations thereof, all of which are well known to those skilled in the art. Hardwired combinational logic or application specific integrated circuits might also be used. The functions of these hardware (structure) elements can certainly be performed in software by a processor or multiple processors performing each function. Each function can also be implemented in discrete logic hardware, a digital signal processor, or some other form of programmable logic.

According to one embodiment of the invention, CAC is run on at least one and preferably each upstream channel to the CMTS, however, the invention is not limited thereto. In this embodiment, there are five different service levels available on each upstream channel: 1). Unsolicited Grant Service (UGS); 2). Unsolicited Grant Service with activity detection (UGS/AD); 3). Real Time Polling Service (RTPS); 4). Non-Real Time Polling Service (NRTPS); and 5). Best Effort (BE). Unsolicited Grant Service has the highest priority while Best Effort as the lowest priority. Unsolicited Grant Service is guaranteed service that should not be interrupted. In Unsolicited Grant Service with activity detection, the system monitors the service for quite periods and the quite periods can be used to carry non-related data. Real Time Polling Service is used for high speed data service and Non-Real Time Polling Service is also used for data service but at lower speeds. Best Effort service is polled at predetermined intervals, for example, every 2 seconds, to see if a request is being made. It will be understood that the upstream channels may have more or less than 5 available service levels without departing from the spirit and scope of the invention.

To use CAC in a CMTS, the CMTS needs to determine various minimum and maximum bandwidth requirements (Tmin, Tmax) for each subscriber. When a cable modem (CM) is activated (powered-up) a service flow is established between the CM and the CMTS. The service flow comprises, among other information, the Tmin, Tmax values for that particular CM. The Tmin, Tmax values may depend on a variety of factors, such as, for example, the capabilities of the CM, the level of service to which the subscriber has subscribed, etc. The Tmin value is the minimum amount of bandwidth that will be available to the subscriber when access is granted, while the Tmax value is the maximum amount of bandwidth that the subscriber can expect to receive when access is granted.

According to one embodiment of the invention, a service administrator determines how much bandwidth is assigned for each type of service flow on each upstream channel. A threshold value is set for each of the different types of service flows. The threshold values and the Tmin, Tmax values are at least some of the parameters used in CAC calculations to provide proper loading of different types of subscribers on an upstream channel.

When the CMTS receives a data request from a new subscriber, CAC first determines the amount of bandwidth available on the upstream channel the subscriber is requesting. CAC then determines the data service flow scheduling type of the requesting subscriber. CAC then determines the amount of bandwidth on the upstream channel for the requesting subscriber type of data service flow scheduling type. CAC then determines how much bandwidth is being requested. CAC then determines whether or not the request can be accepted. In addition to the present capacity, CAC also takes into consideration the Tmin, Tmax values of the subscriber. CAC has a variety of options when a new request is received. For example, CAC can accept the request, deny the request, accept the request, but flag the condition on the link or connection as being oversubscribed for the particular data service flow scheduling type, and/or switch the subscriber to a different link or connection if available.

Figure 3:
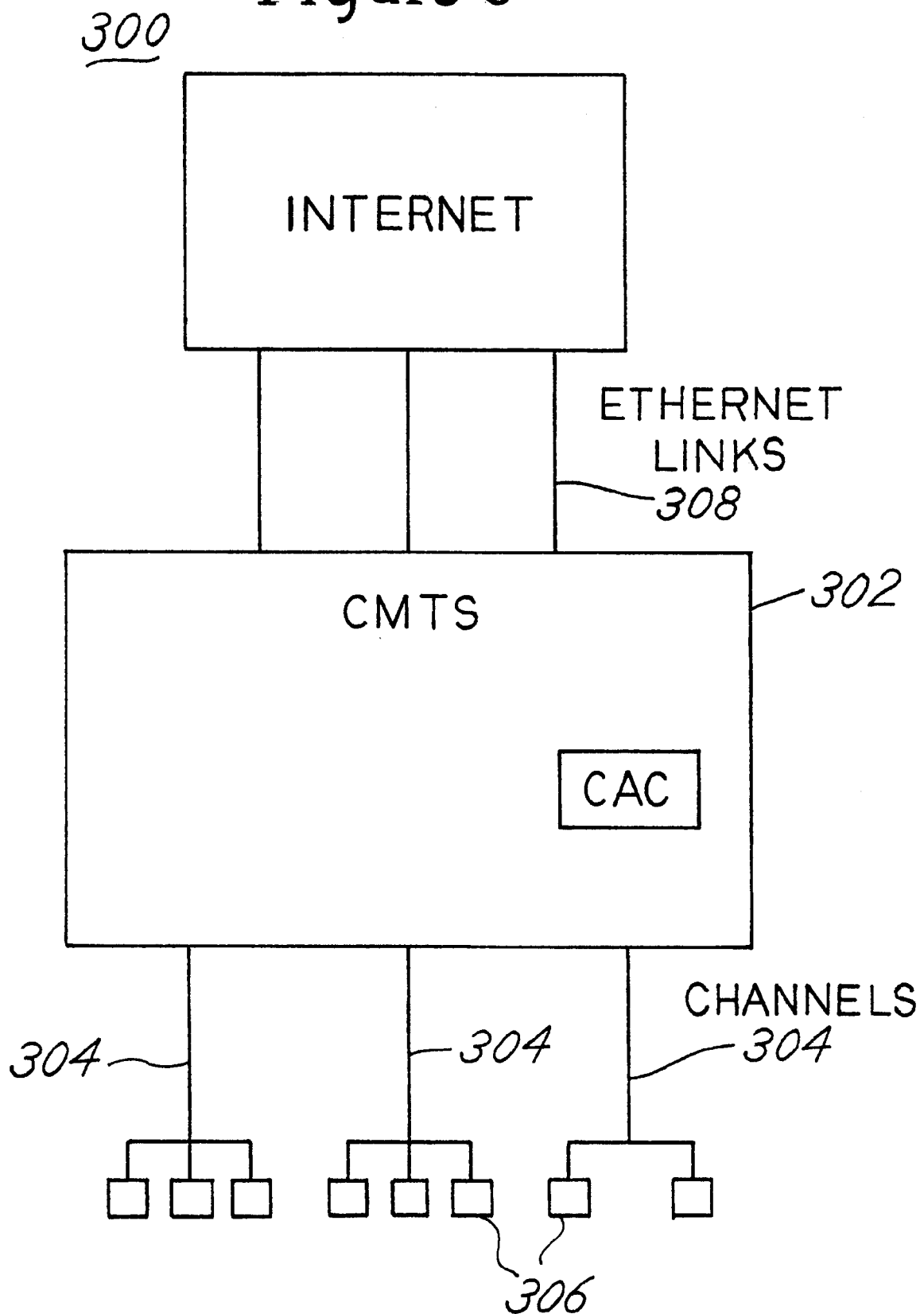
FIG. 3 illustrates a cable data system according to one embodiment of the invention.

Several examples of using CAC on the links of a CMTS will now be described with reference to FIG. 3, which illustrates a system 300 which includes a CMTS 302 according to the invention. The CMTS 302 has a plurality of channels (links) 304 which connect the CMTS 302 to a plurality of subscriber cable modems of "CMs" 306. In this embodiment of the invention, CAC can be used to monitor traffic congestion on some or all of the upstream channels on the links 304.

In this illustrative example, a system administration might have decided that each of the different service flows or data service flow scheduling types will be assigned a threshold value of 20%. As each request for service is made for each upstream channel, CAC first determines the available bandwidth on a requested upstream channel. For example, CAC may determine the available bandwidth for each type of service flow on the channel and add these availabilities together to get the total available bandwidth on the channel. CAC then determines the service flow type being requested and the amount of bandwidth being requested. The amount of available bandwidth for the requested service flow type is then compared with the amount of bandwidth being requested. If the amount of bandwidth being requested is below the amount of available bandwidth for the requested service flow type, then the CMTS can accept the request. However, if the amount of requested bandwidth is greater than the amount of available bandwidth, the CMTS has several options. The CMTS could simply deny the request. Alternatively, the CMTS could assign the requesting subscriber available bandwidth which is not being used by one of the other service flow types. In this scenario, CAC may flag the particular service flow type as being oversubscribed. Alternatively, the CMTS may accept the request using the bandwidth set aside for the particular service flow type. In this scenario, CAC may flag the service flow type as being oversubscribed and the CMTS can randomly lose packets from subscribers of the particular service flow type on the requested upstream channel. In addition, even if no available bandwidth is available for any service flow type, the CMTS can still accept the request for service so long as packets are lost from some or all of the subscribers on the channel. The packets to be lost can be selected at random or the selection can be based on the priority of each subscriber service flow type, wherein subscribers with higher priorities lose less packets.

Alternatively, if the bandwidth of the channel is filly occupied or if the bandwidth assigned to a particular type of service flow type is all currently being used, the CMTS can switch the requesting subscriber to a different channel. The requesting subscriber can be randomly reassigned to a new channel or the GAG can be used to determine the availability of bandwidth of a particular service flow type in other channels, wherein the CMTS switches the requesting subscriber to the channel with the most availability.

While exemplary systems and method embodying the present invention are shown by way of example, it will be understood, of course, that the invention is not limited to these embodiments. Modifications may be made by those skilled in the art, particularly in light of the foregoing teachings. For example, each of the elements of the aforementioned embodiments may be utilized alone or in combination with elements of the other embodiments.

We claim:

1. A method of controlling traffic loading on a cable modem termination system (CMTS) having a plurality of basic upstream data service flow scheduling types for a cable data system, comprised of the steps of:
   determining available bandwidth on an upstream cable data system channel;
   determining one of the plurality of basic data service flow scheduling types of a requesting subscriber;
   determining how much of the available bandwidth on said upstream cable data system channel can be allocated to said data service flow scheduling type;

comparing the available bandwidth on an upstream cable data system channel to the bandwidth to be allocated by the CMIS to the requesting subscriber based upon the type of basic upstream data service flow scheduling type to be allocated to said requesting subscriber;

determining whether the available bandwidth is greater than, less than or equal to the bandwidth to be allocated by the CMTS to the requesting subscriber for the basic upstream cable data system service flow scheduling type to be allocated for the requesting subscriber;

granting or denying cable data service to said requesting subscriber based upon the determining of whether the available bandwidth is greater than, less than or equal to the bandwidth to be allocated to the requesting subscriber; and assigning the requesting subscriber to a different cable data system upstream channel with more available capacity when the available bandwidth on the requested cable data system upstream channel is less than the bandwidth to be allocated to the requesting subscriber.

2. The method according to claim 1, wherein said requesting subscriber is randomly assigned to a different cable data system upstream channel.

3. The method according to claim 1, wherein availability of bandwidth on other upstream cable data system channels is determined before the requesting subscriber is assigned to an upstream cable data system channel with more availability.

4. The method according to claim 1, further comprising the steps of:

granting cable data service to said requesting subscriber on said requested upstream cable data system channel even though the available bandwidth on the requested upstream cable data system channel is less than the bandwidth being allocated to the requesting subscriber; and flagging said requested cable data system channel as being over subscribed.

5. The method according to claim 4, wherein data packets from at least some subscribers with the same service flow type as the requesting subscriber are lost when capacity for the service flow type of the requesting subscriber is over subscribed.

6. The method according to claim 5, wherein data packets are randomly lost.

7. The method according to claim 4, wherein data packets from at least some subscribers are lost when said upstream data channel is over subscribed.

8. The method according to claim 5, wherein data packets are selected to be lost based on each subscriber's service flow type, wherein service flow types with higher priority lose less packets.

9. A system for controlling traffic loading on a cable modem termination system (CMTS) having a plurality of basic upstream data service flow scheduling types for a cable data system, comprising:

means for determining available bandwidth on an upstream cable data system channel;

means for determining one of the plurality of basic data service flow scheduling types of a requesting subscriber;

means for determining how much of the available bandwidth on said upstream cable data system channel can be allocated to said cable data system service flow scheduling type;

means for comparing the available bandwidth on an upstream cable data system channel to the bandwidth to be allocated by the CMTS to the requesting subscriber based upon the type of basic upstream data service flow scheduling type to be allocated to said requesting subscriber;

means for determining whether available bandwith is greater than, less than or equal to the bandwith to be allocated by the CMTS to the requesting subscriber for the basic cable data system service flow scheduling type to be allocated for the requesting subscriber;

means for granting or denying cable service to requesting subscriber based upon the determination of whether the available bandwith is greater than,less than or equal to the bandwith to be allocated to the requesting subscriber; and means for assigning the requesting subscriber to a different upstream cable data system channel with more available capacity when the available bandwith on the requested upstream channel is less than the bandwith to be allocated to the requesting subscriber.

10. The system according to claim 9, wherein said requesting subscriber is randomly assigned to a different upstream channel.

11. The system of claim 9, wherein availability of bandwidth on other upstream cable data system channels is determined before the requesting subscriber is assigned to an upstream cable data system channel with more availability.

12. The system according to claim 9, further comprising:

means for granting cable data service to said requesting subscriber on said requested upstream cable data system channel even though the available bandwidth on the requested upstream data channel is less than the bandwidth being allocated to the requesting subscriber; and means for flagging said requested cable data system channel as being over subscribed.

13. The system according to claim 12, wherein data packets from at least some subscribers with the same service flow type as the requesting subscriber are lost when capacity for the service flow type of the requesting subscriber is over subscribed.

14. The system according to claim 13, wherein data packets are randomly lost.

15. The system according to claim 12, wherein data packets from at least some subscribers are lost when said upstream data channel is over subscribed.

16. The system according to claim 13, wherein data packets are selected to be lost based on each subscriber's service flow type, wherein service flow types with higher priority lose less packets.

* * * * *